Jan. 9, 1962 K. L. HERRMANN 3,016,110
FRICTION REDUCING APPARATUS FOR CAM ENGINES
Filed March 8, 1960 5 Sheets-Sheet 1

INVENTOR.
KARL L. HERRMANN
BY
Peter Patane
HIS ATTORNEY

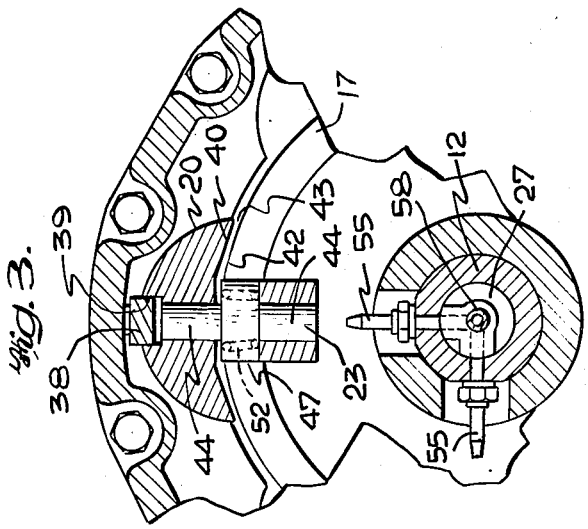
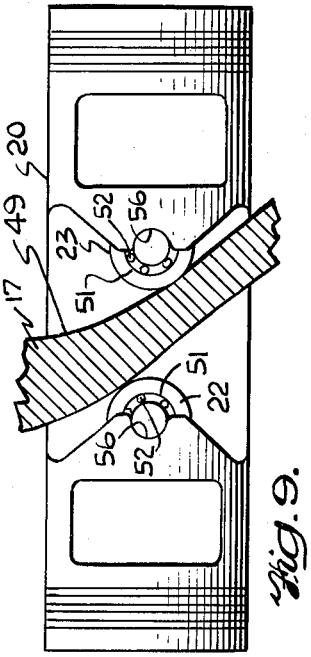
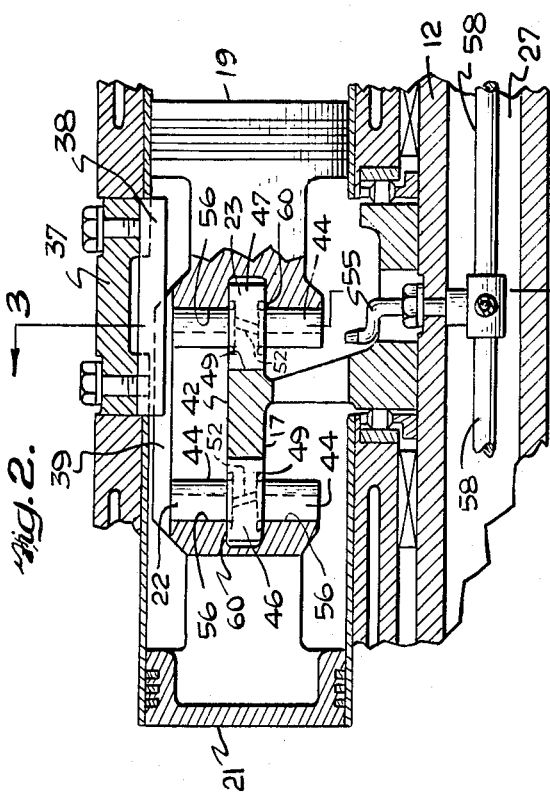
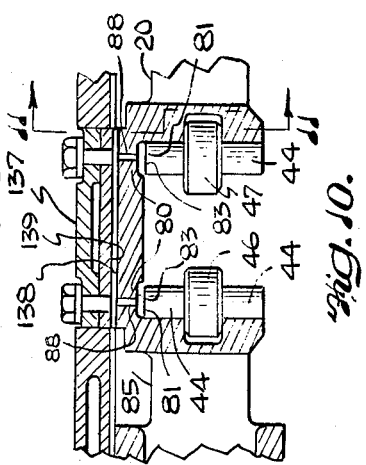

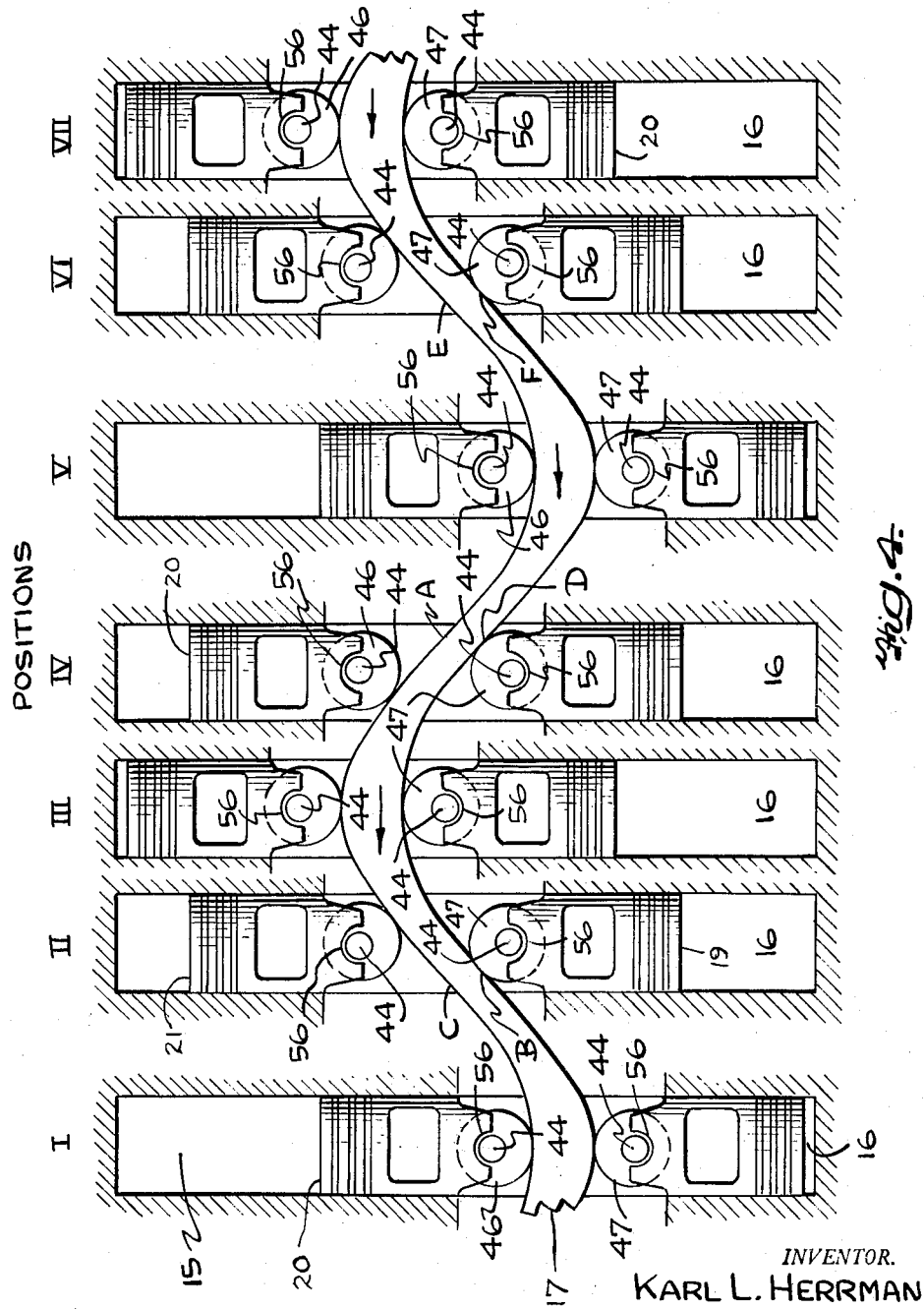

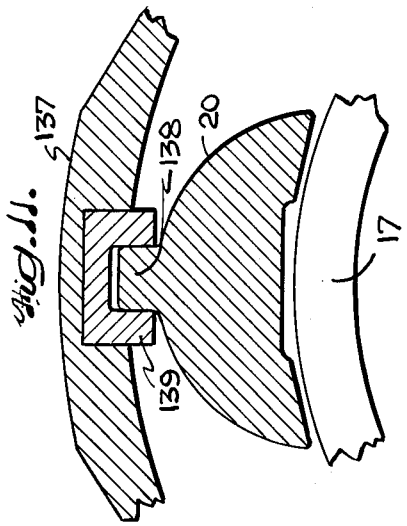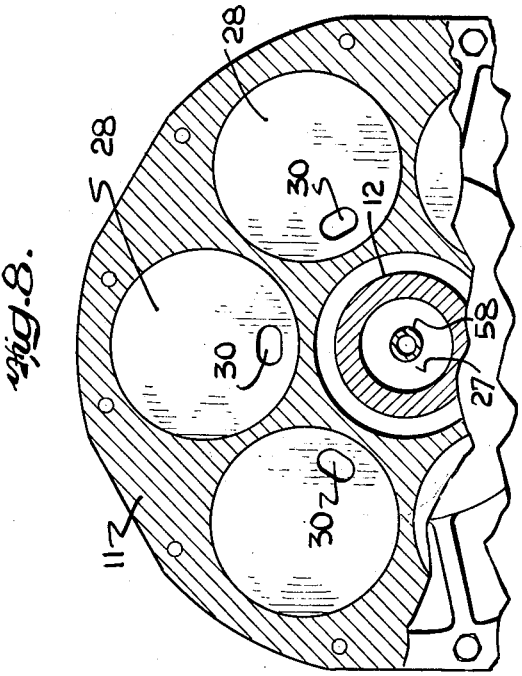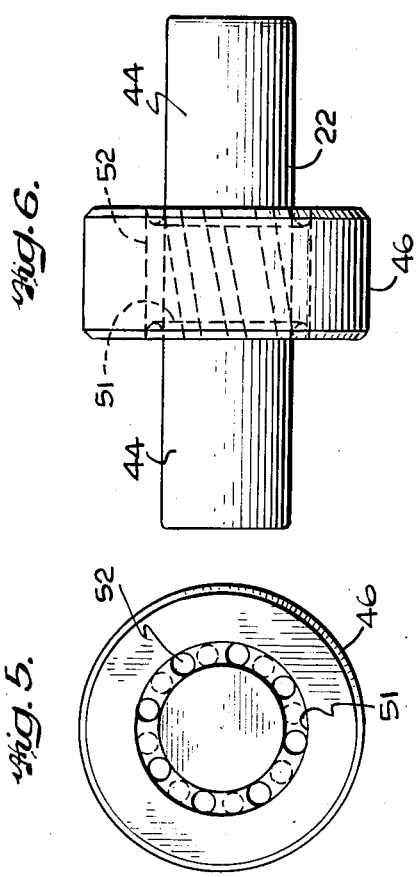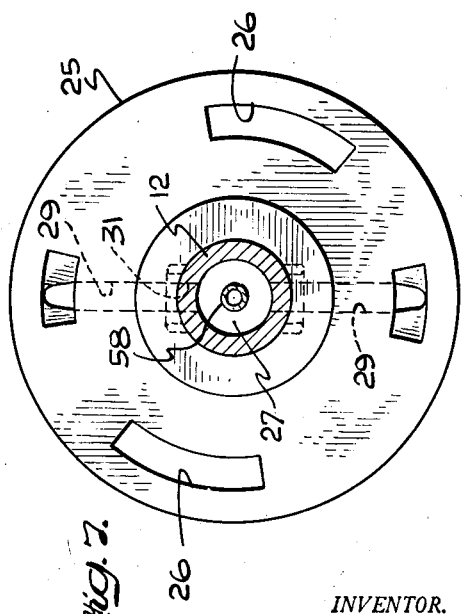
INVENTOR.
KARL L. HERRMANN
BY
HIS ATTORNEY

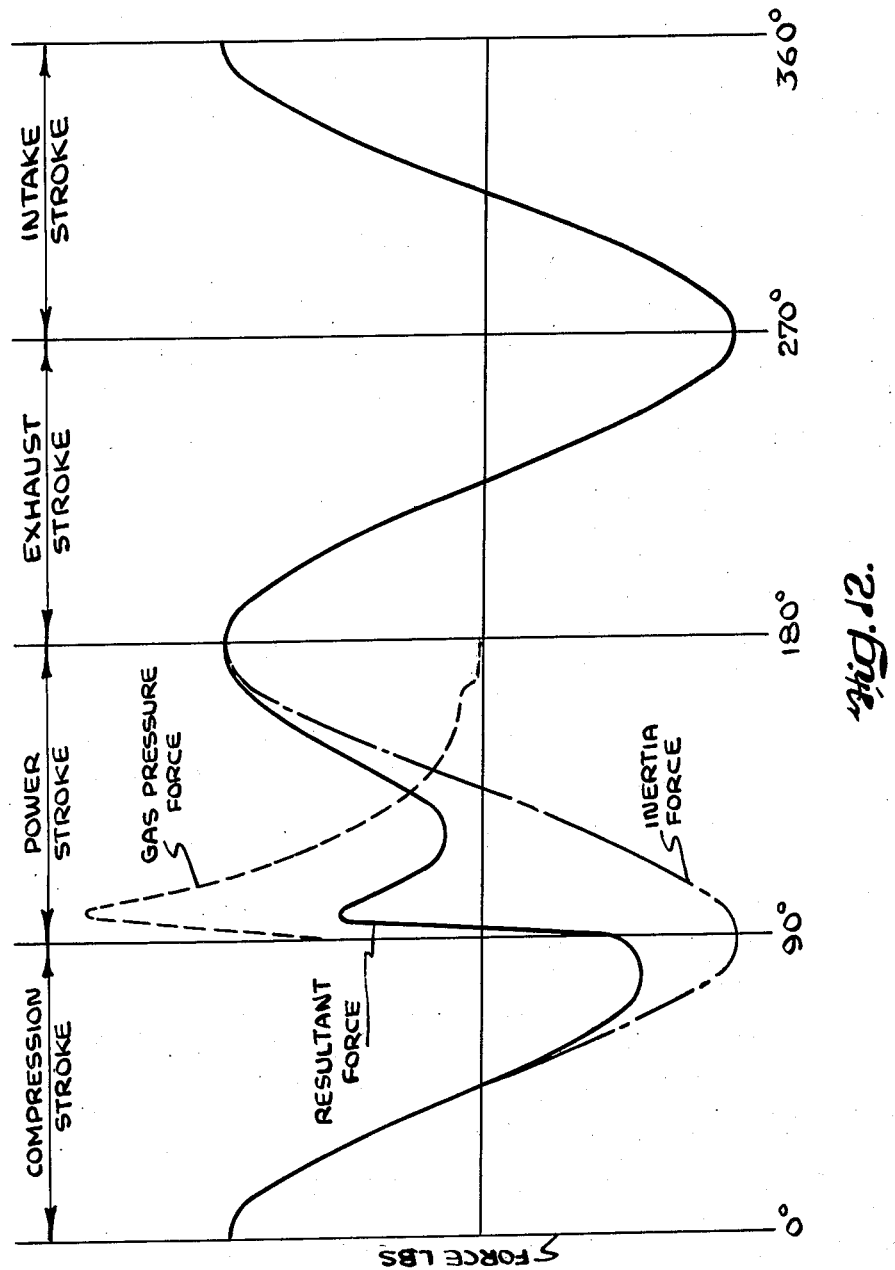

United States Patent Office

3,016,110
Patented Jan. 9, 1962

3,016,110
FRICTION REDUCING APPARATUS FOR CAM ENGINES
Karl L. Herrmann, 1405 Airway, Glendale, Calif.
Filed Mar. 8, 1960, Ser. No. 13,460
5 Claims. (Cl. 184—6)

This invention relates to internal combustion cam engines and specifically to novel improved means for reducing the friction within such engines and to improve the lubrication of certain portions thereof. It is an object of the present invention to minimize the friction losses so that the maximum available power output of the engine may be increased.

Internal combustion cam engines are commonly of the barrel type, that is, an engine in which cylinders at both ends of the engine are located parallel to and about a central shaft and a group of double-ended, reciprocable pistons within the cylinders. A cam is mounted on the central shaft and the periphery of such cam extends into the body of said pistons midway between the ends thereof. The thrust is transmitted from the pistons to the cam followers (mounted in the pistons) and from the cam to the main shaft. Power may be taken off the main shaft in any conventional manner. Such an engine is shown and described in my Patent No. 2,243,817.

Heretofore, in certain engines, the maximum horsepower potential has decreased after the engine has heated up for a period of time. Also, soft spots, spalled spots, and cracks appeared on certain portions of the surfaces of the cams which were subjected to the pressure transmitted by the pistons. I have avoided the disadvantages of the previous constructions by an arrangement which prevents any direct contact between the cam and the piston, which provides means for the better lubrication of the trunnions of the cam followers, and, concurrently with the latter, minimizes the power loss occasioned by the deceleration of the cam follower.

I have discovered that the failure of the cam surfaces has been caused, in part, by the heating of the cam which, in turn, was partly caused by the tendency of the piston to rotate. This tendency of the piston to rotate has been heretofore, prevented by the engagement of a portion of the piston with the horizontal surface of the cam, but such engagement has resulted in substantial friction and a decrease in the potential maximum horsepower of the engine. In my improved engine I have provided keyway means between each double-ended piston and the housing. At the same time, I have provided a clearance between the portion of the piston overlying and, heretofore engageable with, the cam. The keys and keyways prevent the pistons from turning and the lack of contact between the pistons and the horizontal surface of the cam eliminates a substantial area of heating.

It is common, in such engines, to employ cam followers which include rollers with trunnions, the latter rotatable within bearings. The cam followers transmit to and from the cam the forces developed by the pistons during their power strokes. In so doing, the rollers themselves rotate while traversing the cam surface.

The pistons reciprocate in simple harmonic motion and the cam has a shape to allow the displacement of the centers of the cam followers to describe an imaginary sine curve with respect to time. The cam in one such engine has two high and two low points cooperating with the rollers of six pistons. In going from the top to the bottom of the cylinder in the power stroke, for instance, the piston forces the rollers to reciprocate and rotate about their axes, while guided by the undulating cam path which also rotates about its axis. The speed of rotation of these rollers (about their axes) should not be constant but rather should accelerate and decelerate between the high and low points of the cam.

In one such engine, when its shaft is rotated by an external device and no combustion is taking place within the engine, the rotational speed of the rollers should vary from 11,000 r.p.m. at the high and low points of the cam to 14,000 r.p.m. at points midway between the high and low points of the cam. However, I have found that all the rollers do not accelerate and decelerate uniformly in the theoretical manner required. This is due, in part, to the fact that during portions of their travel some of the rollers are coasting and not in traction with the cam and, also, due to the close fit heretofore utilized between trunnions and their bearings and the attendant large friction losses therein.

In these engines, where combustion pistons and compression pistons are disposed on opposite sides of the cam, followers are used on opposite sides of the cam between the cam and the pistons. During operation, certain of the rollers of such engines are coasting due to the non-transmittal of force between these rollers and the cam and certain other rollers are in traction with the cam. Any roller that is coasting loses speed and inertia. Such loss in speed and inertia must be supplied to it, by the cam, during the initial portion of the time when this roller and the cam again come into traction. The initial contact between roller and cam occurs in the same zone of the cam during repetitive cycles. This cam zone becomes heated during the initial contact and then cools. The repetitive, intermittent heating and cooling has caused soft spots, spalled spots and cracks on these portions of the cam surfaces.

I have found that by making the bearing diameter substantially larger than the trunnion diameter and supplying substantial lubricating oil pressure to both the radially inner and radially outer trunnions of each cam follower, I provide a maximum of film of oil in the bearing for each trunnion which decreases the friction loss and substantially reduces the decrease in speed of the cam follower from the decrease occurring heretofore. Thus, the rotational speed of the follower is now closer to the speed it should have when it contacts the cam and the soft spots, spalled spots and cracks are avoided. Also, by the use of such a bearing and full lubrication of both trunnions, the slippage of the cam follower is reduced so that the scuffing of the cam is minimized even though the cam follower must be speeded up to a certain extent by the cam, to meet the peripheral speed of the cam.

The supplying of the lubricating oil to the radially outer trunnion also tends to provide additional lubricant between the cam surface and the surface of the roller at the area where the lubricant tends to be thrown off of the cam surface by centrifugal force.

The foregoing and other objects of my invention, the principles of my invention, and the best modes in which I have contemplated applying such principles will more fully appear from the following description and accompanying drawings in illustration thereof. In the drawings;

FIG. 2 is a detail fragmentary view of a portion of the piston, cam and cam follower roller shown in FIG. 1;

FIG. 3 is a plan view partly in cross section taken along the line 3—3 of FIG. 2;

FIG. 4 is a diagrammatic view of the motion of the cam along the cam follower rollers illustrating the movement of the trunnions of the cam follower roller in their bearings and the various positions of one piston with respect to the cam;

FIGS. 5 and 6 are end and front elevational views, respectively, of one cam follower;

FIG. 7 is an elevational view of the rotary valve taken along line 7—7 of FIG. 1;

FIG. 8 is a partial elevational view of valve plates in the compression cylinders taken along the line 8—8 of FIG. 1;

FIG. 9 is a partial elevational view of one piston and a portion of the cam;

FIGS. 10 and 11 are partial views illustrating modified keys and supply reservoirs for each outermost trunnion; and FIG. 12 is a graph illustrating the forces on one piston for various conditions.

Figure 1:
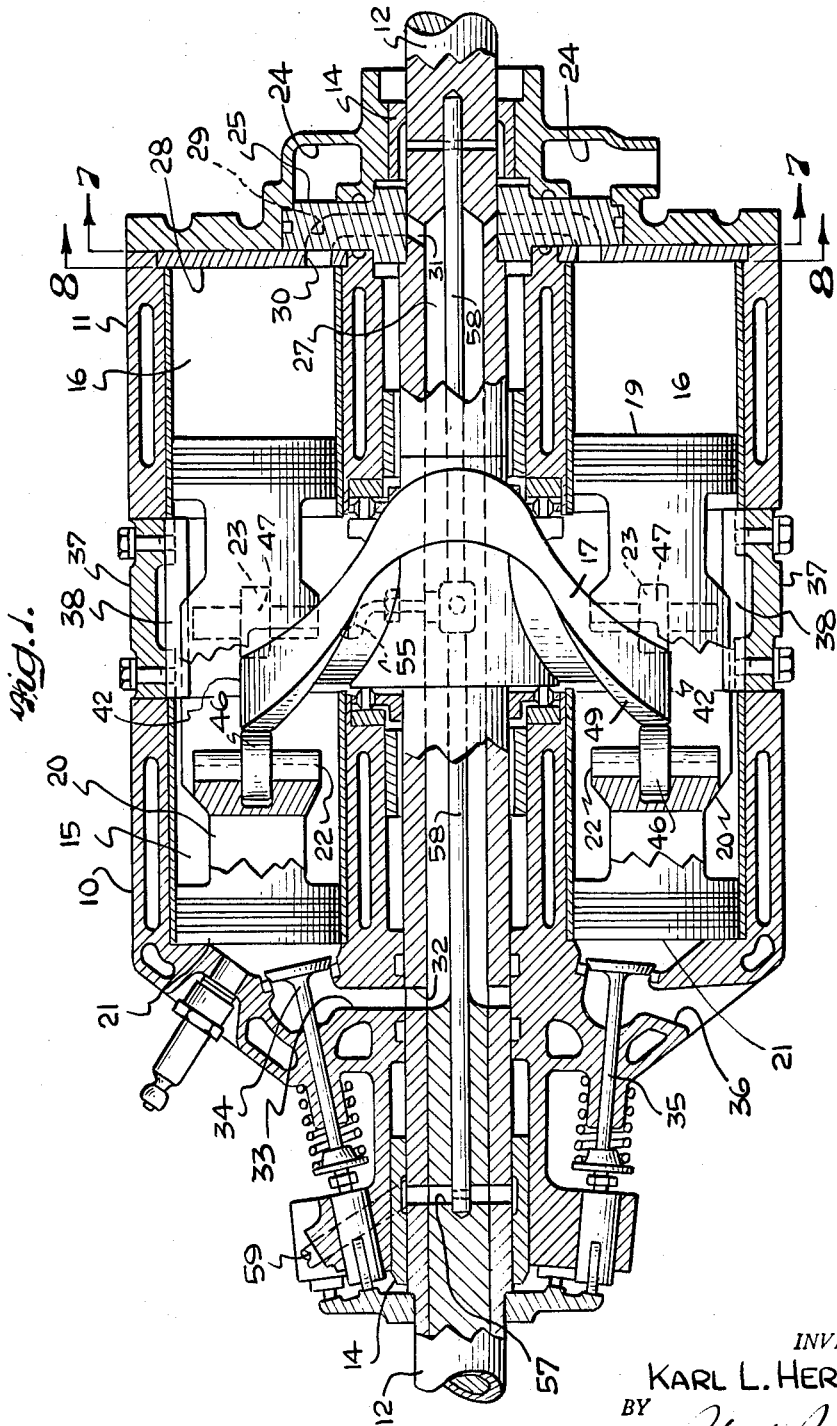
FIG. 1 is a longitudinal sectional view of a cam type engine embodying my invention.

Referring to the drawings, there is disclosed a cam engine having a power end 10 and a supercharger end 11. A drive shaft 12 mounted in suitable journals 14 extends through both halves of said engine. Power or combustion cylinders 15 and supercharger or compression cylinders 16 are equally spaced about the drive shaft 12 and are parallel thereto. Mounted on the drive shaft 12, approximately midway between the ends thereof, is a cam 17 having a generally T-shaped cross section, the peripheral portion of which extends into the midportion of double-ended pistons 20. The pistons 20 reciprocate in the cylinders 15 and 16, and rotate the drive shaft 12 through cam followers 22 and 23 and cam 17.

The details of the operation of a cam engine are set forth in my Patent No. 2,243,817. Briefly, however, fuel-air charges are supplied from a carburetor (not illustrated) to an inlet manifold 24. The fuel-air charges pass from the inlet manifold 24 by means of a rotating valve member 25 having passages 26 (FIG. 7), for sequentially feeding the fuel-air charges into the supercharger cylinders 16 and such charges are pressurized in the super charger cylinders 16. Thereupon such charges under pressure pass through passages 29 in the rotating valve member 25, the passage 29 being in communication through ports 31 with a chamber 27 located in the shaft 12. Plates 28 having openings 30 are provided in the end of each cylinder 16 to prevent the pressurized charges in the chamber 27 from backing up into the cylinders 16. (The openings 30 are periodically placed in communication with the passages 29 by the rotation of the valve member 25.) The ports 32 permit the charges to sequentially flow from the chamber 27 into the power cylinders 15 by means of inlet passages 33 and conventional inlet valves 34. The burning of such charges in the cylinder 15 forces the followers 22 of pistons 20 against the cam 17, thereby rotating the latter and, thereafter, the spent gasses are exhausted through exhaust valves 35 and exhaust passage 36.

During the reciprocation of the pistons 20 they have a tendency to rotate about their longitudinal axis. To prevent this rotation, as indicated in FIGS. 1, 2 and 3, a center spacing member 37 has mounted thereon a key 38 mating with and freely slidable in a keyway 39 in the midportion of the piston 20. This key and keyway prevent the rotation of the piston 20 and the engagement of the surfaces 40 of the pistons 20 with the horizontal surface 42 of the cam 17. The gap 43 between the surfaces 40 and 41 is sufficiently great so that when the cam is heated from the engine operation it will not make contact with the adjacent surfaces 40 of the pistons 20.

The identical cam followers 22 and 23 each consist of a pair fo trunnions 44 supporting rollers 46 and 47, the surfaces of which engage the peripheral surfaces 49 of the cam 17. The trunnions 44 rotate in bearings 56 and are supported along their longitudinal axes by shoulders 60, both bearings 56 and shoulders 60 being formed in pistons 20. All the rollers 46 and 47 have annular grooves or undercuts at 51, as illustrated in FIG. 6, and holes 52 inclined to the longitudinal axis of the followers are bored through the web of the rollers adjacent to the junction of the trunnions 44 with the rollers. The tops and bottoms of the holes 52 are interconnected by the undercuts 51. Such holes 52 and undercuts 51 form a pump to pump the oil emitted by nozzles 55 to the bearings 56 for the radially outermost trunnions 44.

The cam followers 22 and 23 are identical except that the holes 52 are inclined (relative to the longitudinal axis of the followers) in opposite directions. The holes 52 of each follower are inclined so as to receive the lubricant from the nozzles 55 and direct it toward the upper bearings 56, as viewed in FIG. 2. In FIG. 2, only one hole has been illustrated in each of the rollers 46 and 47, for the purpose of clarity, but as will be observed from FIGS. 5 and 6 each of the rollers 46 and 47 is provided with a pluarlity of such holes. The holes 52 of opposed rollers are inclined in opposite directions because the rollers on opposite sides of the cam rotate in opposite directions and they are thus better enabled to receive the lubricant from the nozzles 55 and deliver it, in conjunction with the annular undercuts 51, to the upper bearings 56 (FIG. 2). Also, it will be noted that a certain portion of the lubricant is trapped in both the upper and lower annular undercuts 51 for better lubricating the shoulders 60 and the upper and lower bearings 56.

Two nozzles 55 (FIG. 3) are provided at a right angle to each other and both are connected to a tube 58 which is supplied with suitable lubricant.

The nozzles 55 are disposed on opposite sides of the cam to supply both cam followers 22 and 23. The tube 58 is supplied by inlet conduits 59 through passages 57 and carries lubricating oil both to the nozzle 55 and other sections of the engine. The tube 58 is carried by the shaft 12 so that the tube 58 and the nozzles 55 rotate therewith.

The nozzles 55 also spray the cam surfaces 49. The oil pumped by the cam followers 22 and 23 is directed toward the key 38 and keyway 39 and lubricates these members also, as best illustrated in FIG. 2.

As may be seen in FIG. 4 the cam 17 is assumed to move from right to left in the drawing and the power cylinders are at the top and the supercharger cylinders are at the bottom. The illustration of FIG. 4 represents the rotation of three-fourths of the cam by one of the pistons 20 and illustrates various positions of the one piston 20 for four cycle operation of the piston power end 21. The piston supercharger end 19 completes two cycles of two reciprocations each and discharges into the shaft chamber 27 two air-fuel charges for each power cycle of four reciprocations that is completed by the power end 21 but each of the power cycles utilizes two air-fuel charges.

The trunnions 44 are cylindrical in cross sectional shape and the bearings 56 are made of diameters sufficiently larger than the diameters of the trunnions 44 so that at all times the trunnions are shiftable and supported by curved wedged shaped films of lubricant disposed between the trunnions and the bearings. The bearing diameters are sufficiently larger than the trunnion diameters to provide minimum dimensions for the curved wedge, in the plane illustrated by FIG. 4, of between .002 and .004 inch for each one-half inch of trunnion diameter up to a trunnion diameter of one and one-half inches. Thus, for a trunnion diameter up to and including one-half inch, the bearing diameter would be between .002 and .004 inch larger; for a trunnion diameter larger than one-half inch to and including one inch, the bearing diameter would be between .004 and .008 inch larger; and for trunnion diameters larger than one inch to and including one and one-half inches, the bearing diameter would be between .006 and .0012 inch. For trunnion diameters larger than one and one-half inches to and including two inches, a bearing diameter of between .008 and .012 inch larger than the trunnion diameter is sufficient. Differences in diameter larger than .012 inch are not desired because of the likelihood of chatter of the trunnions in their bearings.

In FIG. 4, various positions of operation are illustrated and Position I shows the start of the compression stroke in the power cylinder 15 and the start of the intake stroke in the supercharger cylinder 16. Position III illustrates the start of the power stroke in the power cylinder 15 and the start of the compression stroke in the supercharger cylinder 16. Position V illustrates the start of the exhaust stroke in the power cylinder 15 and the start of another intake stroke in the supercharger cylinder. Position VII illustrates the start of the intake stroke in the power cylinder 15 and the start of the compression stroke in the supercharger cylinder 16.

Positions II, IV and VI illustrate the intermediate positions showing the shifting of the trunnions within their bearings on their curved wedges of lubricant. In Positions I, III, V and VII the forces are transmitted between the cam and the pistons through the curve wedged shaped lubricant films along lines which are coaxial with the longitudinal axes of the pistons but in Positions II, IV and VI the forces are at a 45° angle thereto, illustrating that the angle of force transmittal varies with the point at which contact is made between rollers and cam.

For the rollers 46 and 47 to traverse the cam properly, the rollers should both increase from the same minimum speed at Position I to the same maximum speed at points C and B, midway between Positions I and III, and then decrease from this maximum speed to the minimum speed at Position III. Likewise, in going from Position III to V and V to VII the rollers should attain maximum speeds at mid-points A, D, E and F and minimum speeds at Positions V and VII. Because the rollers 46 and 47 are not both in traction with the cam at all times, the roller which is coasting loses speed and inertia. For instance, when the roller 46 is coasting and the roller 47 is in traction with the cam, heretofore the roller 46 has lost so much speed that the cam was forced to increase the speed of the roller drastically within a short time period. This drastic acceleration has caused the cam surface to become overheated and has been followed by a period of cooling.

I have found that the previously described oversize bearings, curved lubricant wedges and full lubrication of the outermost trunnion substantially aid in the maintenance of the speed of the roller during the time it is coasting so that when the coasting roller is placed in traction with the cam, the cam does not heat up sufficiently to produce the aforementioned deleterious results.

In the graph, FIG. 12, the line consisting of terminal portions which are solid lines and a mid-portion which is a dot-dash line represents the inertia force on one of the reciprocating pistons 20 when the shaft 12 of the engine is being rotated by an external device. At such time it will be noticed that, starting with the piston on a low point of the cam (Position I), the inertia force becomes zero periodically after 45°, 135°, 225° and 315° of cam rotation. At each of the enumerated points, traction and coasting alternate, for this piston, between the roller on one side of the cam to the roller on the other side of the cam.

In one engine, when the cam of the engine was rotated by an external device, the speed of the roller 46, for instance, which was in traction with the cam at Position III, accelerated from 11,000 r.p.m., at the time the power stroke began at the high point of the cam, to 14,000 r.p.m. at the mid-point A of the slope of the cam between Positions III and V. Heretofore, in engines not incorporating the present invention, during the travel between Positions III and IV, the roller 47 coasted and its speed and inertia reduced to such an excessive degree below the 14,000 r.p.m. desired, at the mid-point D between Positions III and V, where traction between the cam surface and the roller 47 at point D began, that the cam tried to speed up the roller instantaneously to the speed it should have, overheating the cam surface. Thereafter, from the mid-point D to Position V, the speed of the roller 47 decelerated to 11,000 r.p.m. at Position V, a low point of the cam, at the end of the power stroke.

With the engine running under its own power at a certain throttle setting and speed, a similar situation results from that described in connection with the engine being rotated by an outside source. The solid line, in the graph, is the resultant curve of the gas pressure force, shown by a dotted line, and the inertia force of the reciprocating piston. The solid line represents the actual force being transmitted to or by the rollers of this piston. It will be noted that the reversal, between traction in one roller on one side of the cam and coasting of the opposite roller of this piston, now occurs at the mid-stroke of each piston, 45°, 225° and 315°, except during the power stroke of the piston. For the conditions illustrated, during the power stroke, the reversal takes place first at 96° (where the gas pressure just balances the inertia force) and again at 120° (where the inertia force starts to become less than the gas pressure). The latter reversal varies substantially depending on the load upon the engine and the closer to full load, the closer to the peak of the cam (or nearer the point at which combustion initiates) will the reversal take place.

My improved bearings and lubricating apparatus prevents the coasting roller from losing so much speed and inertia that when contact is made between the cam and the roller, the cam is not heated up excessively. This prevents certain portions of the cam surface from repetitively becoming overheated and then cooled and avoids the occurrence of soft spots, spalled spots and cracks on the cam surface.

I have also found that the wear and tear on the cam surface is also reduced and the traction between the cam surface and the rollers increased by careful control of the relative hardness between the cam surface as compared to the roller surfaces. I have found that such difference in hardness to be preferably from two to six points Rockwell C. Thus, where the roller surface is between 58 and 60 (preferably 59) Rockwell C, the cam is preferably made between 62 and 64 (preferably 63) Rockwell C. Such softer roller surface widens the contact surface between the roller and the cam, reduces the compressive force per unit area below that previously utilized and results in a roller of longer life.

As illustrated in FIG. 10, integral cover portions 80 of the pistons 20 define, with the end faces 81 of the radially outermost trunnions 44, spaces 83 for trapping a part of the lubricant and further insuring full lubrication of the radially outermost trunnions. The spaces 83 provide a supply of lubricant in close proximity with and available to the bearings for the outermost trunnions. As illustrated, the spaces 83 are located between the outermost trunnions and the keys and keyways. Holes 88 are provided in the pistons to drain the spaces 83 of the lubricant continuously supplied thereto (through the nozzles 55 and the holes 52 in the cam followers) when the trunnions move to one side or the other of the key.

FIG. 11 illustrates a modification of the keying arrangement. In FIG. 11, the piston 120 is provided with an integral key 138 which extends into a keyway 139 formed in the center spacer 137.

The holes 52, in the cam followers 22 and 23, may also be inclined from top to bottom, as viewed in FIG. 3, so that the top of the holes 52 will be farther away from the axis of rotation of the cam follower, to increase the pumping effect of the holes 52.

Having described this invention, I claim:
1. In an internal combustion engine having a shaft, a housing defining a plurality of cylinders arranged with their axes parallel to said shaft and grouped around said shaft, said shaft including a cam, pistons reciprocable in said cylinders, rotatable followers carried by said pistons and engageable with said cam, lubricating means for supplying lubricant to one side of said followers, said followers including pump means rotatable therewith for the passage of said lubricant to the other side of said followers.

2. The structure recited in claim 1 wherein said followers include rollers and trunnions, said trunnions being disposed on opposite sides of said rollers, said lubricating pump means comprising said rollers having holes extending through the roller from the trunnion on one side to the trunnion on the other side.

3. The structure recited in claim 2 wherein said holes are inclined relative to the axis of rotation of said followers and said pump means further comprises said rollers having annular grooves for interconnecting said holes.

4. In an internal combustion engine having a rotatable shaft, a housing defining a plurality of cylinders arranged with their axes parallel to said shaft and grouped around said shaft, said shaft including a cam, pistons reciprocable in said cylinders cam followers engageable with said cam, said followers including trunnions, bearings carried by said pistons for supporting said trunnions, said shaft having a chamber formed therein, lubricating means rotatable with said shaft for supplying lubricant to said cam followers and bearings comprising a tube within said chamber, a rotatable nozzle connected to said tube, said nozzle being adjacent the cam and followers for simultaneously directly delivering lubricant to said cam and followers, said nozzle being rotated by the shaft and lubricant supply means connected to said tube.

5. In an internal combustion engine having a shaft, a housing defining a plurality of cylinders arranged with their axes parallel to said shaft and grouped around said shaft, said shaft including a cam, pistons reciprocable in said cylinders, rotatable followers carried by said pistons and engageable with said cam, lubricating means for supplying lubricant to one side of said followers, said followers including pump means rotatable therewith for the passage of said lubricant to the other side of said followers, said shaft having a chamber formed therein, said lubricating means including a tube within said chamber, and a rotatable nozzle rotatable with said shaft and connected to said tube, and lubricant supply means connected to said tube.

References Cited in the file of this patent

UNITED STATES PATENTS

| 1,204,892 | Macomber | Nov. 14, 1916 |
| 1,543,113 | Lleo et al. | June 23, 1925 |
| 2,091,949 | Alfaro | Sept. 7, 1937 |
| 2,243,819 | Herrmann | May 27, 1941 |
| 2,417,487 | Hall | Mar. 18, 1947 |

FOREIGN PATENTS

| 20,751 | Great Britain | Sept. 10, 1909 |